US012491518B2

(12) United States Patent
Nicholls et al.

(10) Patent No.: US 12,491,518 B2
(45) Date of Patent: Dec. 9, 2025

(54) GYRATORY CRUSHER, A METHOD FOR ROTATING AN UPPER CRUSHER FRAME AND A RETROFITTING KIT

(71) Applicant: Metso Outotec USA Inc., Waukesha, WI (US)

(72) Inventors: Carl Nicholls, Forrestdale (AU); Ian VanZyl, Baldivis (AU)

(73) Assignee: METSO USA INC., Brookfield, WI (US)

( * ) Notice: Subject to any disclaimer, the term of this patent is extended or adjusted under 35 U.S.C. 154(b) by 165 days.

(21) Appl. No.: 17/918,741

(22) PCT Filed: Jun. 17, 2021

(86) PCT No.: PCT/IB2021/055360
§ 371 (c)(1),
(2) Date: Oct. 13, 2022

(87) PCT Pub. No.: WO2021/260506
PCT Pub. Date: Dec. 30, 2021

(65) Prior Publication Data

US 2023/0234068 A1 Jul. 27, 2023

(30) Foreign Application Priority Data

Jun. 26, 2020 (SE) .................................... 2050768-7

(51) Int. Cl.
*B02C 2/04* (2006.01)
*B02C 2/06* (2006.01)

(52) U.S. Cl.
CPC ................ *B02C 2/045* (2013.01); *B02C 2/04* (2013.01); *B02C 2/06* (2013.01)

(58) Field of Classification Search
CPC ..... B02C 2002/002; B02C 2/00; B02C 2/005; B02C 2/02; B02C 2/04; B02C 2/045; B02C 2/06
See application file for complete search history.

(56) References Cited

U.S. PATENT DOCUMENTS 2,586,122 A 2/1952 Traylor
3,837,585 A 9/1974 Decker et al.
(Continued)

FOREIGN PATENT DOCUMENTS

CN 103764288 A 4/2014
CN 204134675 U 2/2015
(Continued)

OTHER PUBLICATIONS

International Search Report and Written Opinion for International Application No. PCT/IB2021/055360, mailed Sep. 22, 2021.
(Continued)

*Primary Examiner* — Matthew Katcoff
(74) *Attorney, Agent, or Firm* — Andrus Intellectual Property Law, LLP

(57) ABSTRACT

A gyratory crusher for comminution of material fed into the crusher. The gyratory crusher includes an upper crusher frame for supporting one or more wear parts. The upper crusher frame is configurable between an operation mode and a rotation mode. The gyratory crusher further includes a lower crusher frame, wherein the upper crusher frame in the operation mode is in engagement with the lower crusher frame. The gyratory crusher further includes a rotation device configured to rotate the upper crusher frame in relation to the lower crusher frame. The rotation device includes a gear ring configured to be rotatable relative to the lower crusher frame around a vertical axis. A method, and a retrofitting kit, for rotating an upper crusher frame of a gyratory crusher relative to a lower crusher frame of the gyratory crusher are also disclosed.

11 Claims, 6 Drawing Sheets

(56) References Cited

U.S. PATENT DOCUMENTS

| | | | | |
|---|---|---|---|---|
| 8,870,105 | B2 * | 10/2014 | Gunnarsson | B02C 2/042 241/207 |
| 9,227,191 | B2 * | 1/2016 | Belotserkovskiy | B02C 2/047 |
| 2005/0269436 | A1 * | 12/2005 | Sawant | B02C 2/04 241/215 |
| 2016/0051988 | A1 * | 2/2016 | Kaja | B02C 2/045 241/207 |

FOREIGN PATENT DOCUMENTS

| | | | |
|---|---|---|---|
| CN | 204448110 | U | 7/2015 |
| CN | 108043504 | A | 5/2018 |
| CN | 209917955 | U | 1/2020 |
| EP | 2554269 | A1 | 2/2013 |
| EP | 2599550 | A1 | 6/2013 |
| WO | 2010123431 | A1 | 10/2010 |
| WO | 2014064329 | A1 | 5/2014 |
| WO | 2016028444 | A1 | 2/2016 |

OTHER PUBLICATIONS

Written Opinion of the International Preliminary Examining Authority for International Application No. PCT/IB2021/055360, mailed Jun. 2, 2022.

Search Report for corresponding Chinese Application No. 20211071259812, dated Jul. 26, 2022.

Search Report for priority Swedish Application No. 2050768-7, mailed Dec. 8, 2020.

* cited by examiner

GYRATORY CRUSHER, A METHOD FOR ROTATING AN UPPER CRUSHER FRAME AND A RETROFITTING KIT

CROSS-REFERENCE TO RELATED APPLICATIONS

This application is the U.S. national stage application of International Application PCT/IB2021/055360, filed Jun. 17, 2021, which international application was published on Dec. 30, 2021, as International Publication WO 2021/260506 A1 in the English language. The International Application claims priority Swedish Patent Application No. 2050768-7 filed Jun. 26, 2020.

FIELD

The present disclose relates to a gyratory crusher. The present disclosure further relates to a method for rotating an upper crusher frame of a gyratory crusher, and a retrofitting kit for a gyratory crusher.

BACKGROUND

Gyratory Crushers utilize wear parts to protect the machine from damage and perform the actual crushing of material such as ore or minerals. The two types of wear part are the mantle, which is disposed on a main shaft, and a set of several wear parts, often termed concaves, which are situated onto surrounding walls of the gyratory crusher, which walls defines the crushing chamber of the crusher. Thus, the mantle is fixed to the main shaft and the concaves are fixed to the upper crusher frame. Due to the excessive wear during crushing of material such as stone, minerals and ore, the wear parts must be replaced from time to time. The mantle wears down faster than the concaves, thus needing to be replaced faster than the concaves. Replacing either of the concaves or mantle is a lengthy and expensive process, which requires extensive shut-down time. Furthermore, certain segregated feed arrangements can result in uneven wear distribution resulting in parts of the concaves wearing down significantly faster than other parts. Usually, there is no choice but to perform a concave changeout once the minimum concave thickness is reached in areas with a high wear rate, which results in disposing of expensive wear parts that may still be usable. An alternative to this is to rotate the upper crusher frame and reassemble the machine. Thus, placing areas which have previously been in areas with a low wear rate in areas with a high wear rate. This alternative may require several major lifts for disassembling and reassembling the gyratory crusher, thus, making it an expensive task that requires a lengthy shut-down, thus in many cases making it a non-viable alternative. There is thus a need for improvements in the area.

SUMMARY

According to a first aspect there is provided a gyratory crusher for comminution of material fed into the crusher, the gyratory crusher comprising:

- an upper crusher frame for supporting one or more wear parts, wherein the upper crusher frame is configurable between an operation mode and a rotation mode;
- a lower crusher frame;
- wherein the upper crusher frame in the operation mode is in engagement with the lower crusher frame; and

- a rotation device configured to rotate the upper crusher frame in relation to the lower crusher frame, and wherein the rotation device comprises a gear ring configured to be rotatable relative to the lower crusher frame around a vertical axis, and wherein the upper crusher frame is engaged with the gear ring, and configured to rotate, in the rotation mode, together with the gear ring around the vertical axis.

Consequently, a gyratory crusher is provided which allows for rotating wear parts to different angular positions. This way, it is possible to achieve a more uniform wear of each wear part. The gyratory crusher allows for making the rotation faster compared to previous solutions. Having a faster solution aids in reducing downtime and/or shutdown operational costs. The gyratory crusher also allows for saving costs and space, as the need for a high capacity crane in the vicinity of the gyratory crusher may be made obsolete.

The term "gyratory crusher" is to be interpreted as a crusher comprising a frame including in its lower part an actuating mechanism comprising an eccentric and driving means, and in its upper part a cone-shaped crushing chamber, lined with wear-resisting plates, often referred to as concaves. These one or more wear plates present one of the surfaces against which material is crushed. The one or more wear plates acts as passive crushing members. The upper crusher frame may be for supporting one, two, three, four or more wear elements. Spanning the crushing chamber across its top is a top framework including a spider containing a machined journal which fixes the position of the upper end of the main shaft. The active crushing member consists of the main shaft and its crushing head and mantle which mantle presents the other surface against which material crushing is made. This assembly is usually suspended by a spider bushing.

In other words, the present inventive concept is directed to a specific kind of gyratory crusher. Therefore, the first aspect may alternatively be expressed as the provision of a gyratory crusher for comminution of material fed into the crusher, the gyratory crusher comprising:

- an active crushing member consisting of a main shaft, a crushing head and a mantle which mantle presents an outer surface against which material crushing is made;
- an upper crusher frame for supporting one or more wear parts, wherein the upper crusher frame defines a cone-shaped crushing chamber and is configurable between an operation mode and a rotation mode;
- a lower crusher frame;
- wherein the upper crusher frame in the operation mode is in engagement with the lower crusher frame;
- a top framework which spans the crushing chamber across its top said top framework including a spider containing a machined journal which fixes the position of the upper end of the main shaft; and
- a rotation device configured to rotate the upper crusher frame in relation to the lower crusher frame, and wherein the rotation de-vice comprises a gear ring configured to be rotatable relative to the lower crusher frame around a vertical axis, and wherein the upper crusher frame is engaged with the gear ring, and configured to rotate, in the rotation mode, together with the gear ring around the vertical axis.

The term "upper crusher frame" should be construed as the supporting frame onto which the wear-resisting plates, e.g. the concaves, are mounted. The upper crusher frame thus defines the cone-shaped crushing chamber. The upper crusher frame may comprise more than one part. The upper crusher frame may for example comprise a bottom part and a top part, each of the bottom and top parts may support one or more wear parts from the one or more wear parts.

The term "lower crusher frame" should be construed as a supporting frame which supports the upper crushing frame.

The term "wear part" should be construed as any kind of wear-resistant elements configured to be in direct contact with material to be crushed. The wear parts mounted on the upper crushing structure are usually referred to as concaves.

The term "gear ring" should be construed as a ring-shaped substantially circular tooth rack or gear. The gear ring may cover a full 360 degrees (full gear ring). However, it is also conceivable that the gear ring covers less than 360 degrees. This implies that the gear ring may be for example a semi-ring.

The term "operation mode" should be construed as the mode of operation used during crushing or just prior to crushing. Thus, the operation mode is the working mode of the crusher.

The term "rotation mode" should be construed as the mode of operation used during rotation of the upper crushing frame in relation to the lower crushing frame. The rotation mode is typically not carried out during operation, i.e. crushing, even if this is conceivable.

The engagement between the upper crusher frame in the operation mode and the lower crusher frame may be a locked engagement. The locked engagement may be carried out by bolting the upper crusher frame to the lower crusher frame. The locked engagement may be carried out by clamping the upper crusher frame to the lower crusher frame. The locked engagement may be carried out by a mating connection between mutually complementing shapes of the upper crusher frame and the lower crusher frame. For some embodiments it is conceivable that the engagement between the lower crusher frame and the upper crusher frame is not a locking engagement. For such embodiments, the engagement between the upper crusher frame and the lower crusher frame may allow for the upper crusher frame to rotate relative to the lower crusher frame, also when the upper crusher frame is in the operation mode.

The rotation device may be connected directly to the lower crusher frame. The rotation device may be connected to a floor in the vicinity of the gyratory crusher. The rotation device may be connected to a stationary part of the gyratory crusher. At least part of the rotation device may be formed integrally with the lower crusher frame. Alternatively, the rotation device is a fully modular solution, which may be retrofitted on gyratory crushers.

According to some embodiments, the rotation device further comprises a drive system comprising one or more pinions, wherein the one or more pinions are configured to rotate the gear ring relative to the lower crusher frame around the vertical axis.

The drive system may be powered by one or more motors, such as e.g. hydraulic motors, pneumatic motors, or electric motors. The drive system may comprise one, two, three, four or more pinions. Alternatively, The drive system may comprise one, two, three, four or more gears configured to rotate the gear ring relative to the lower crusher frame around the vertical axis. The one or more pinions may be carried by a pinion support arrangement which is attached to the lower crusher frame or another stationary part of the gyratory crusher. Alternatively, the pinion support arrangement may be placed in the vicinity of the gyratory crusher. It is also conceivable that the pinion support arrangement is an integrally formed part of the lower crusher frame or another stationary part of the crusher.

According to some embodiments, the rotation device further comprises one or more arms connected to the lower crusher frame, wherein the one or more arms are configured to support the drive system.

Consequently, the drive system may be connected to the lower crusher frame, thus easing installation of the drive system relative to the lower crusher frame. The arms may be formed integrally together with the lower crusher frame. Alternatively, the arms may be bolted, welded, or by other means fixed onto the lower crusher frame. Preferably, the number of arms match the number of pinions of the drive system. The one or more arms may each present a surface for supporting one or more pinions.

According to some embodiments, the rotation device further comprises one or more support structures connected to the lower crusher frame, wherein the one or more support structures presents one or more support surfaces for supporting the gear ring, and wherein the gear ring is configured to rotate on the one or more support surfaces.

The one or more support structures advantageously allows for supporting the gear ring so as to keep the gear ring in its intended position. Thus, by the one or more support structures, the gear ring will be kept in its intended position in relation to the lower crusher frame and/or the upper crusher frame. The intended position is to be understood as a position of the gear ring allowing the gear ring to engage and to rotate the upper crusher frame in the rotation mode. In some embodiments the gear ring may be kept substantially parallel with a horizontal plane by the one or more support structures. In some embodiments the gear ring may be angled with a horizontal plane even when supported by the one or more support structures.

The one or more support structures may be connected to, or attached to, the lower crusher frame. Alternatively, the one or more support structures may be connected to, or attached to, another stationary part of the gyratory crusher. It is also conceivable that the one or more support structures are an integrally formed part of the lower crusher frame or another stationary part of the crusher. The rotation device may comprise one, two, three, four or more support structures.

According to some embodiments, the one or more support surfaces comprises a low friction material for reducing friction between the gear ring and the one or more support surfaces.

The low friction material may be advantageous as it allows for reducing the friction between the gear ring and the one or more support structures. The low-friction material may comprise, or consist, of Polytetrafluoroethylene (PTFE)-based formulas, such as Teflon, or polyethylene or other plastic materials. Alternatively, the one or more support surfaces may comprise rollers wheels, or bearings for facilitating rotation of the gear ring on the one or more support structures.

According to some embodiments, the gear ring encloses the lower crusher frame.

A gear ring covering the whole 360 degrees may be advantageous as it allows reaching all angular positions when rotating the upper crusher frame.

According to some embodiments, the upper crusher frame is engaged with the gear ring such that the upper crusher frame, in the rotation mode, is allowed to move in relation to the gear ring along the vertical axis.

This arrangement may be advantageous as it allows the upper crusher frame to move freely in the vertical direction, i.e. along the direction of the vertical axis. This, in turn, allows for rotating the upper crusher frame in relation to the lower crusher frame when the upper crusher frame is distanced from the lower crusher frame for example by spacers in-between the lower crusher frame and the upper crusher frame or being hoisted, or lifted by a crane or by other lifting means, as will be further discussed below.

According to some embodiments, the upper crusher frame comprises one or more protrusions, wherein the rotation device comprises one or more slot structures connected to the gear ring, and wherein the one or more protrusions are engaged with the one or more slot structures when the upper crusher frame is in the rotation mode.

The one or more protrusions may be integrally formed in an outer surface of the upper crusher frame. Alternatively, the one or more protrusions may be defined by one or more fastening elements, which fastening elements are attachable to the upper crusher frame. In other words, each fastening element may present a respective protrusion. The protrusions may be engaged with the slot structures when the upper crusher frame is in the operation mode. The upper crusher frame may comprise one, two, three, four or more protrusions.

According to some embodiments, the gyratory crusher further comprises lifting means configured to lift the upper crusher frame to separate the upper crusher frame from the lower crusher frame.

The lifting means may be advantageous as it allows decoupling the upper crusher frame from the lower crusher frame without a need for an external crane.

The lifting means may be in the form of one or more actuators, such as hydraulic or pneumatic actuators. The lifting means is configured to lift the upper crusher frame to separate the upper crusher frame from the lower crusher frame. For some embodiments, the lifting means is additionally configured to support the upper crusher frame in an elevated position while the upper crusher frame is rotated in relation to the lower crusher frame. The lifting means may for example engage an external rim of the upper crusher frame.

According to a second aspect there is provided a kit comprising:

- a gyratory crusher according to a first aspect of the invention; and
- one or more support devices, the one or more support devices being configured to be disposed in-between the lower crusher frame and the upper crusher frame in the rotation mode to support the upper crusher frame during rotation thereof and to facilitate rotation of the upper crusher frame.

The kit may be advantageous as it allows for rotating the upper crusher frame in relation to the lower crusher frame without the need of supporting the upper crusher frame by a lifting force applied, e.g. by an external crane. The one or more support devices may be elements comprising one or more wheels, one or more rollers, or one or more bearings of suitable type. The one or more wheels, the one or more rollers, or the one or more bearings may be arranged in a ring shape suitable for being disposed in-between the lower crusher frame and the upper crusher frame in the rotation mode. Alternatively, the one or more support devices may be one or more support plates having at least one low-friction surface. The low-friction surface may be embodied by the one or more support devices comprising, or consisting, of a low-friction material such as a Polytetrafluoroethylene (PTFE)-based formula, such as Teflon. The kit may comprise support devices for fully covering a rim of the lower crusher frame. The kit may comprise one, two, three, four or more support devices for covering a rim of the lower crusher frame.

According to a third aspect there is provided a method for rotating an upper crusher frame of a gyratory crusher relative to a lower crusher frame of the gyratory crusher, the method comprising the steps of:

- a) providing a gyratory crusher according to any one of the first aspect;
- b) releasing, if the upper crusher frame is in the operation mode, the engagement between the upper crusher frame and the lower crusher frame to bring the upper crusher frame from the operation mode into the rotation mode, and
- c) rotating, via the rotation device, the upper crusher frame relative to the lower crusher frame.

According to some embodiments, the step b) further comprises:

- b.1) lifting the upper crusher frame to separate the upper crusher frame from the lower crusher frame;
- b.2) disposing one or more support devices in between the lower crusher frame and the upper crusher frame to support the upper crusher frame during rotation thereof and to facilitate rotation of the upper crusher frame; and
- b.3) lowering the upper crusher frame down onto the one or more support devices.

According to a fourth aspect, there is provided a retrofitting kit for a gyratory crusher for rotating an upper crusher frame of a gyratory relative to a lower crusher frame of the gyratory crusher around a vertical axis during a rotation mode of the upper crusher frame, the retrofitting kit comprising:

- a gear ring configured to be rotatable relative to the lower crusher frame around the vertical axis, be in engagement with the upper crusher frame, and to rotate, in the rotation mode, together with the gear ring around the vertical axis;
- a drive system comprising one or more pinions, wherein the one or more pinions are configured to rotate the gear ring relative to the lower crusher frame around the vertical axis; and
- one or more support structures configured to be connected to the lower crusher frame, wherein the one or more support structures presents one or more support surfaces for supporting the gear ring, and wherein the gear ring is configured to rotate on the one or more support surfaces.

The retrofitting kit may be advantageous as it allows updating a conventional gyratory crusher with the disclosed functionality of being able to rotate the upper crusher frame to allow distributing the wear more uniformingly on the wear parts.

According to some embodiments, the retrofitting kit further comprises one or more fastening elements presenting one or more protrusions, said fastening elements being configured to be attached to the upper crusher frame, wherein the retrofitting kit further comprises one or more slot structures connected to the gear ring, and wherein the one or more protrusions are engaged with the one or more slot structures when in use on the gyratory crusher.

According to some embodiments, the retrofitting kit further comprises lifting means configured to lift the upper crusher frame to separate the upper crusher frame from the lower crusher frame.

According to some embodiments, the retrofitting kit further comprises one or more support devices, the one or more support devices being configured to be disposed in-between the lower crusher frame and the upper crusher frame in the rotation mode to support the upper crusher frame during rotation thereof and to facilitate rotation of the upper crusher frame.

The different aspects of the present invention can be implemented in different ways described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependent claims.

Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
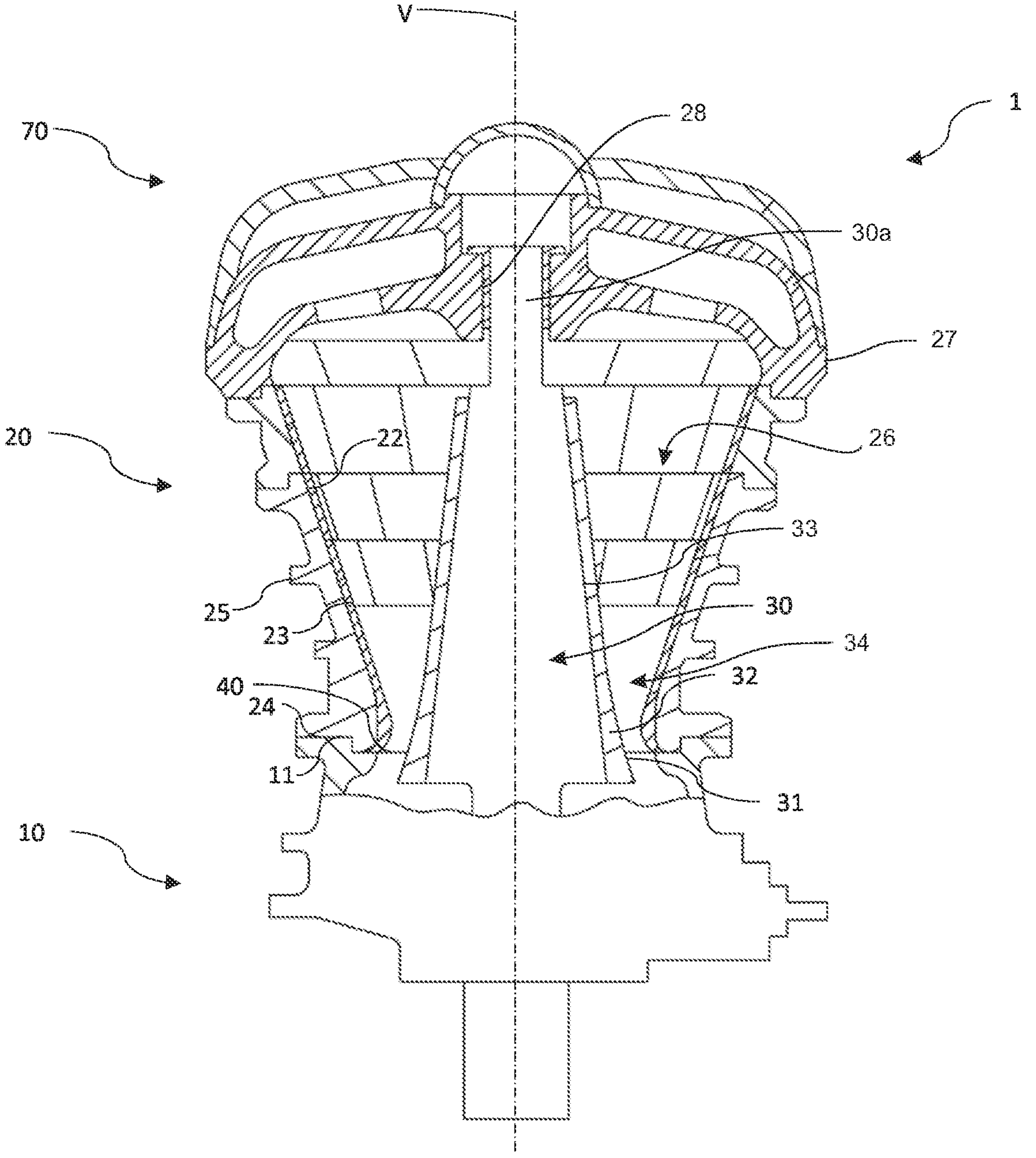
FIG. 1 depicts a cross-section of a gyratory crusher without a rotation device according to the disclosure.

Referring initially to FIG. 1, which depicts a cross-section of a gyratory crusher 1 without a rotation device 50 according to the disclosure. The gyratory crusher 1 comprises a top framework 70. The top framework 70 defines one or more feed inlets for introducing a feed to the gyratory crusher 1. The feed introduced to the gyratory crusher may stem from a feeder arrangement or directly from a truck tip. The gyratory crusher 1 comprises an upper crusher frame 20. The upper crusher frame 20 defines a cone-shaped crushing chamber 26. The top framework 70 spans the crushing chamber 26 across its top. The top framework 70 includes a spider 27 which contains a machined journal 28. The upper crusher frame 20 has an exterior surface 25. The upper crusher frame 20 has an interior surface 22. The interior surface 22 supports one or more wear parts 23. The one or more wear parts 23 may be one or more concave liners 23. Extending longitudinally within the upper crusher frame 20 is a main shaft 30. The position of an upper end 30*a* of the main shaft 30 is fixed by the machined journal 28 of the spider 27. The main shaft 30, which presents a crushing head 33, forms a part of an active crushing member 34 which further consists of a mantle 32 which mantle 32 presents an outer surface 31 against which material crushing is made. The main shaft 30 extends along a vertical axis V. During operation of the gyratory crusher 1 the main shaft 30 is configured to gyrate, thus creating an angle between the longitudinal extension of the main shaft 30 and the vertical axis V. Gyration of the main shaft 30 in return gyrates the mantle 32. The gyration of the mantle 32 allows for material to be crushed in a crushing gap 40. The crushing gap 40 is defined by the one or more wear elements 23 supported by the upper crusher frame 20 and the exterior surface 31 of the mantle 32. Thus, material being fed through the top framework 70 may be crushed between the wear elements 23 supported by the upper crusher frame 20 and the exterior surface 31 of the mantle 32. Fed material which have been crushed may then pass through the crushing gap 40 and into the lower crusher frame 10. The lower crusher frame 10 is situated vertically below the upper crusher frame 20. The lower crusher frame 10 supports the upper crusher frame 20. When the upper crusher frame 20 is in an operation mode, i.e. crushing material or ready for receiving material to be crushed, the upper crusher frame 20 is in engagement with the lower crusher frame 10. The engagement between the upper crusher frame 20 and the lower crusher frame 10 may assure the upper crusher frame 20 does not move relative to the lower crusher frame 10 when the upper crusher frame 20 is in the operation mode. The engagement between the upper crusher frame 20 and the lower crusher frame 10 may be achieved by bolting the upper crusher frame 20 to the lower crusher frame 10. The engagement may be carried out by bolting a connection surface 24 of the upper crusher frame 20 to a connection surface 11 of the lower crusher frame 10. The engagement between the upper crusher frame 20 and the lower crusher frame 10 may be achieved by mechanically mating the upper crusher frame 20 and the lower crusher frame 10 to delimit movement in a horizontal plane and letting the weight of the upper crusher frame 20 and the top framework 70 stop movement vertically along the vertical axis V. The engagement may be carried out by mechanically mating the connection surface 24 of the upper crusher frame 20 to the connection surface 11 of the lower crusher frame 10.

Figure 2:
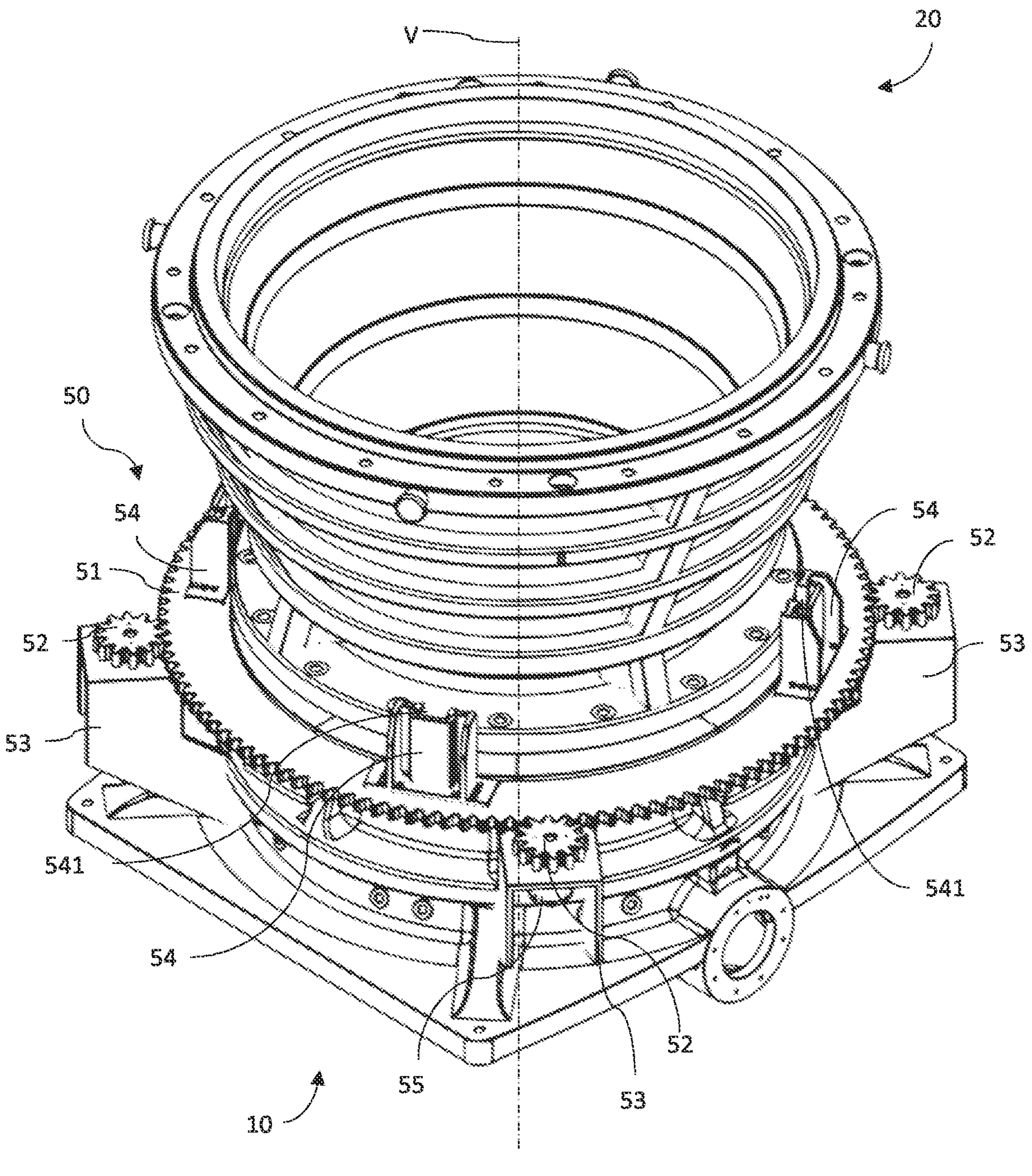
FIG. 2 depicts a perspective view of an upper crusher frame, a lower crusher frame and a rotation device according to the disclosure.

Referring to FIG. 2, which depicts a perspective view of an upper crusher frame 20, a lower crusher frame 10 and a rotation device 50 according to the disclosure. The rotation device 50 comprises a gear ring 51. The gear ring 51 is configured to be rotatable relative to the lower crusher frame 10 around a vertical axis V. The gear ring 51 is engaged with the upper crusher frame 20. The upper crusher frame 20 is configured to rotate, in a rotation mode, together with the gear ring 51 around the vertical axis V. The rotation mode being a mode wherein the upper crusher frame 20 is free to rotate relative to the lower crusher frame 10. In engagement with the gear ring are several pinions 52. The pinions 52 may also be formed as gears 52. The pinions 52 form a drive system for rotating the gear ring 51 relative to the lower crusher frame 10 around the vertical axis V. The pinions 52 are situated on surfaces presented by arms 53 connected to and extending from the lower crusher frame 10. Within the arms 53 internal spaces are formed for accommodating drive means 55 for powering the pinions 52. The drive means 55 may be hydraulic motors 55. Thus, when the motors 55 are powering the pinions 52, the pinions 52 rotates and in return rotates the gear ring 51. When the upper crusher frame 20 is in the rotation mode, the rotation of the gear ring 51 results in the upper crusher frame 20 being rotated. The upper crusher frame 20 is engaged with the gear ring via protrusions 21, shown FIGS. 5 and 6, keyed into slot structures 54. The slot structures 54 are fixedly connected to the gear ring 51. The slot structures 54 defines vertical slots 541 for accommodating the protrusions 21 of the upper crusher frame 20. The vertical slots 541 of the slot structures 54 allows movement of the protrusions vertically. The vertical slots 541 of the slot structures 54 delimits movement of the protrusions horizontally, and in return rotational movement of the upper crusher frame 20 relative to the gear ring 51. The slot structures 54 may be bolted or welded onto the gear ring 51. Alternatively, the slot structures 54 may be integrally formed in the gear ring 51.

Figure 3:
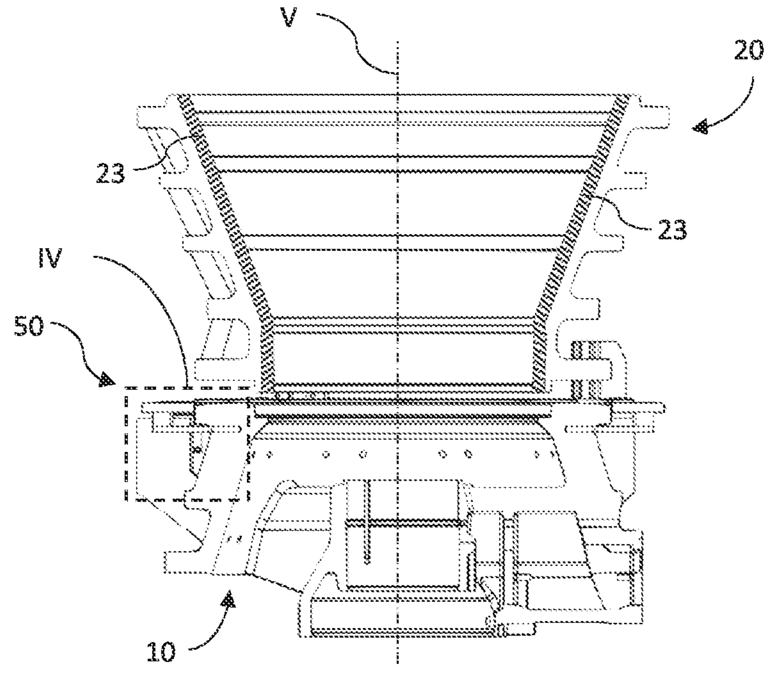
FIG. 3 depicts a cross-section of an upper crusher frame, a lower crusher frame and a rotation device according to the disclosure.
Figure 4:
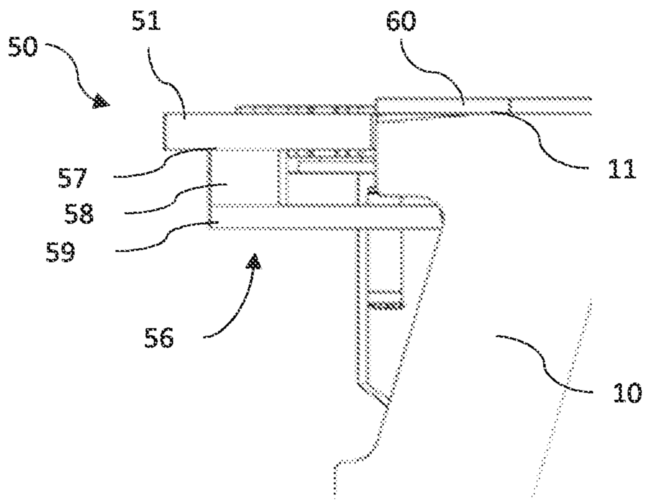
FIG. 4 depicts a close-up cross-sectional view of the lower crusher frame and the rotation device of FIG. 3

Referring now to FIGS. 3 and 4, where FIG. 3 depicts a cross-section of an upper crusher frame 20, a lower crusher frame 10 and a rotation device 50 according to the disclosure, and FIG. 4 depicts a close-up cross-sectional view of the lower crusher frame 10 and the rotation device 50 of FIG. 3. The upper crusher frame 20 supports one or more wear elements 23. The one or more wear elements 23 may be concave liners 23. The gear ring 51 is supported by support structures 56. The support structures 56 are connected to the lower crusher frame 10. The support structures 56 may be bolted onto or welded onto the lower crusher frame 10. The support structures 56 comprises a support arm 59 extending from the lower crusher frame 10. In some embodiments the support arm 59 may be integrally formed with the lower crusher frame 10. The support arm 59 supports a low friction material 58. The support structures 56 comprises support surfaces 57. The support surfaces 57 supports the gear ring 51. The gear ring 51 is configured to rotate on the support surfaces 57. The support surfaces 57 are presented by the low friction material 58. The low friction material 58 being for reducing friction between the gear ring 51 and the support surfaces 57. The low friction material 58 may be Teflon (Polytetrafluoroethylene). A connection surface 11 of the lower crusher frame 10 may be provided with one or more support devices 60. The support devices 60 are provided on top of the connection surface 11 of the lower crusher frame 10. The support devices 60 are configured to be disposed in-between the lower crusher frame 10 and the upper crusher frame 20, when the upper crusher frame 20 is in the rotation mode. The support devices 60 are configured to support the upper crusher frame 20 during rotation thereof and to facilitate rotation of the upper crusher frame 20. The support devices 60 may for example comprise a Teflon surface upon which the upper crusher frame 20 may rotate. The support devices 60 may be bolted onto the lower crusher frame 10 or be mechanically mated to the lower crusher frame 10. Preferably, the support devices 60 are releasably engaged to the lower crusher frame 10, when the upper crusher frame 20 is in the rotation mode. Thus, the support devices 60 may ensure a smooth rotation of the upper crusher frame 20 around a vertical axis V. The support devices 60 may be formed as one or more pads presenting a low friction surface for the upper frame to rotate on, when disposed between the lower crusher frame and the upper crusher frame.

Figure 5:
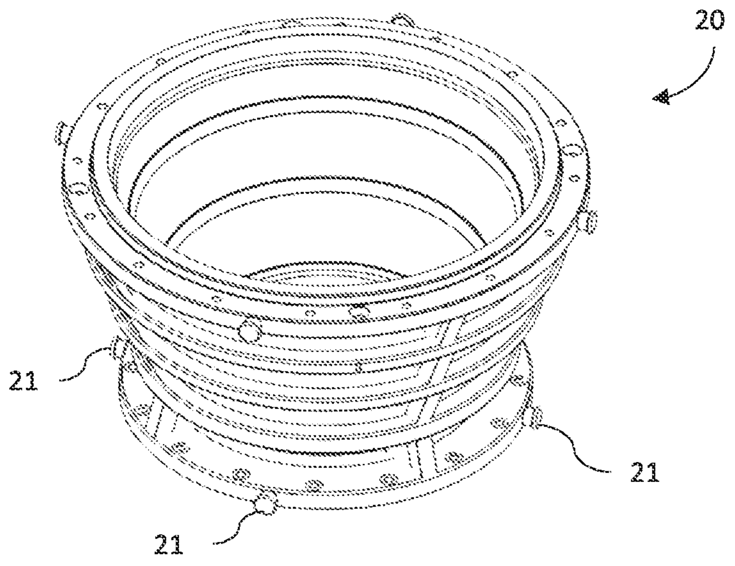
FIG. 5 depicts a perspective view of an upper crusher frame according to the disclosure.
Figure 6:
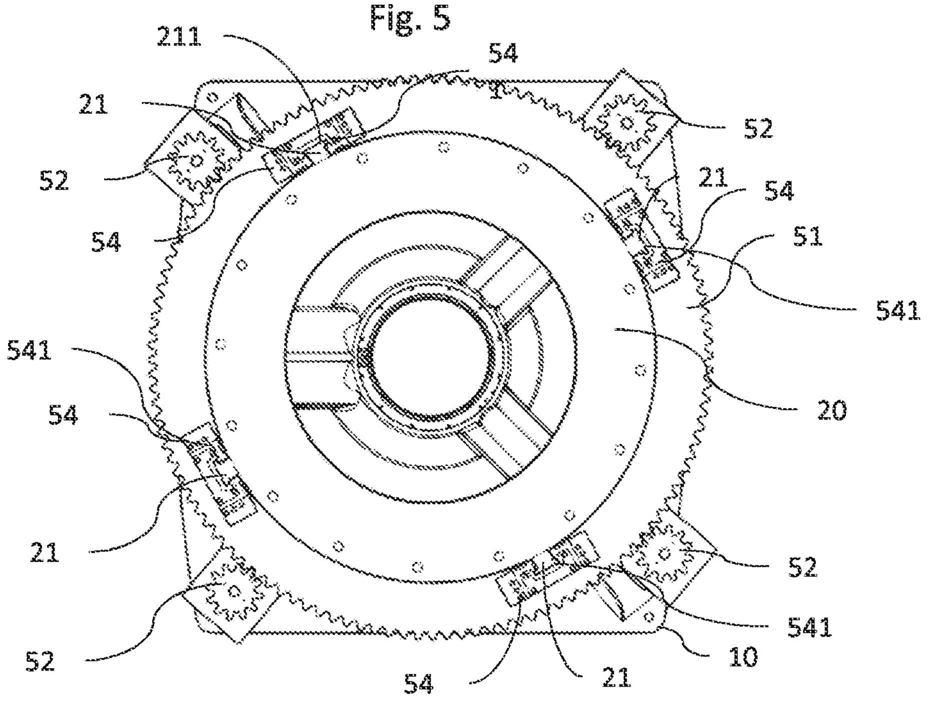
FIG. 6 depicts a cross-sectional view of an upper crusher frame in engagement with a gear ring of a rotation device according to the disclosure.

Referring now to FIGS. 5 and 6, where FIG. 5 depicts a perspective view of an upper crusher frame 20, and FIG. 6 depicts a cross-sectional view of an upper crusher frame 20 in engagement with a gear ring 51 of a rotation device 50 according to the disclosure. The upper crusher frame 20 comprises several protrusions 21. The protrusions 21 are configured to engage with slot structures 54 on a gear ring 51. The protrusions 21 are formed as a cylinder 21 extending from the upper crusher frame 20. The cylinder 21 extending from the upper crusher frame 20 ends in an end flange 211. The end flange 211 provides a widened portion of the protrusion 21. On FIG. 6 the protrusions are depicted in engagement with a slot structure 54 on the gear ring 51. The slot structures 54 are provided with vertical slots 541 for vertically receiving the protrusions 21. The vertical slots 541 of the slot structure 54 conforms to shape of the protrusions 21, thus providing a keyed connection between the slot structures 54 and the protrusions 21. Other shapes of protrusions 21 are also imaginable for providing a keyed connection. Preferably, the protrusions 21 may be any shape with a widened portion for providing a keyed connection. The keyed connection between the slot structures 54 and the protrusions 21 assures that the upper crusher frame 20 rotates together with the gear ring 51. Thus, when the pinions 52 starts rotating the gear ring 51 and the upper crusher frame 10 also rotates.

Figure 7:
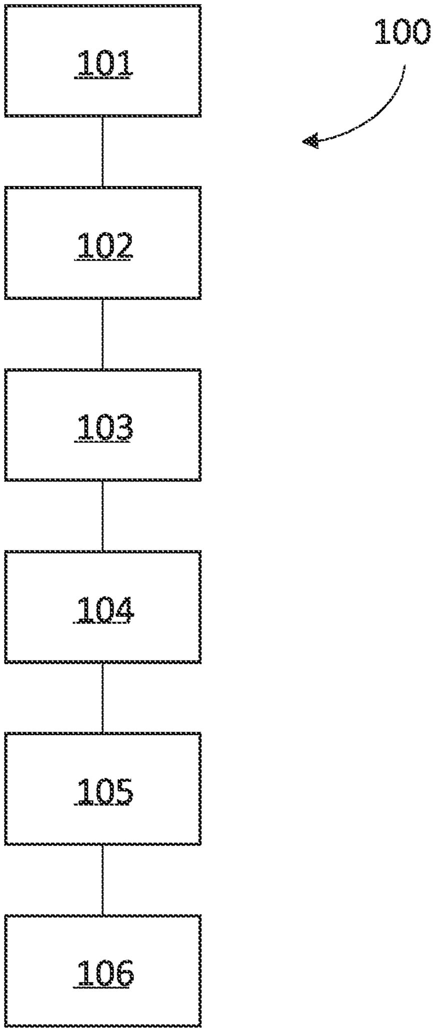
FIG. 7 depicts a block diagram of a method according to the disclosure.

Referring to FIG. 7, which depicts a block diagram of a method 100 according to the disclosure. The method 100 is for rotating an upper crusher frame 20 of a gyratory crusher 1 relative to a lower crusher frame 10 of the gyratory crusher 1. In a first step 101 a gyratory crusher 1 is provided. The gyratory crusher provided may be any gyratory crusher according to the first aspect of the disclosure. In a second step 102 the engagement between an upper crusher frame 20 and a lower crusher frame 10 of the gyratory crusher 1 is released to bring the upper crusher frame 20 from an operation mode into a rotation mode. The second step 102 may be performed by unbolting the lower crusher frame 10 from upper crusher frame 20, if these are bolted together. In a third step 103 the upper crusher frame 20 is lifted to separate the upper crusher frame 20 from the lower crusher frame 10. The upper crusher frame 20 may be lifted by a crane. The upper crusher frame 20 may be lifted by lifting means (not shown) part of the crusher 1 in the form of one or more actuators, such as hydraulic or pneumatic actuators, or alternatively by an external crane (not shown). In a fourth step 104 one or more support devices 60 are disposed in between the lower crusher frame 10 and the upper crusher frame 20 to support the upper crusher frame during rotation thereof and to facilitate rotation of the upper crusher frame 20. In a fifth step 105 the upper crusher frame 20 is lowered down onto the one or more support devices 60. In a sixth step 106 the upper crusher frame 20 is rotated, via a rotation device 50, relative to the lower crusher frame 10. Even though the steps of the method 100 have been numbered this does not imply an order of the steps or that every step is essential. For example, the fourth step 104 may in some cases not be needed as the upper crusher frame 20 may be able rotate relative to the lower crusher frame 10 without the one or more support devices 60. In some cases the upper crusher frame 20 may be lifted to release trapped dust or other particles between the lower crusher frame 10 and the upper crusher frame 20. This may help in lowering friction between the upper crusher frame 20 and the lower crusher frame 10. The third step 103 may also be carried out without the fourth step 104 or the fifth step 105, so the upper crusher frame 20 is simply rotated while lifted.

Figure 8:
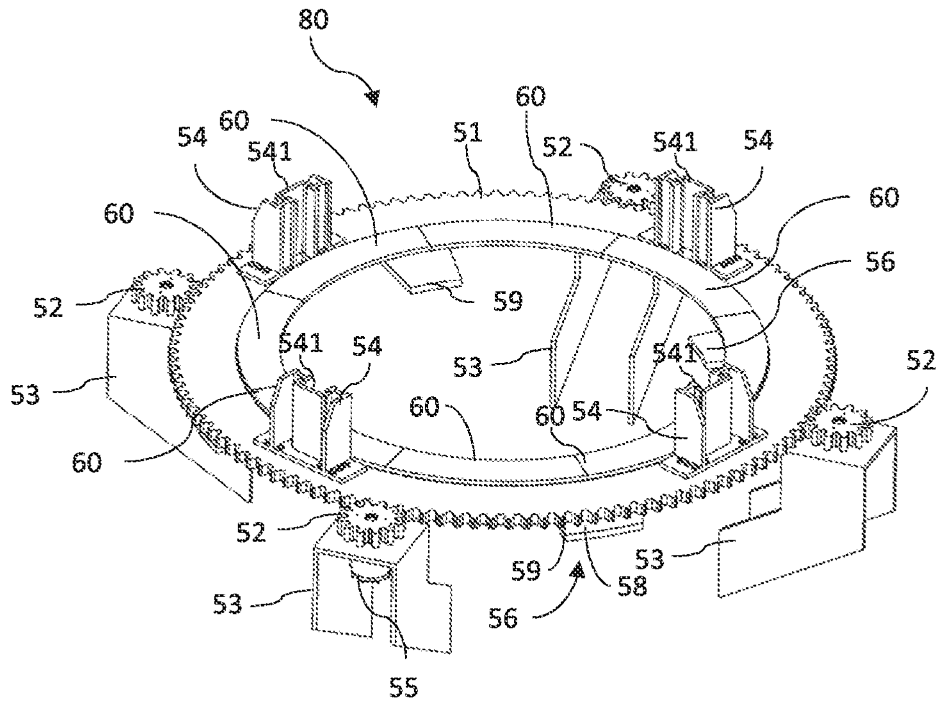
FIGS. 8 and 9 depict parts of a retrofitting kit for a gyratory crusher according to the disclosure.
Figure 9:
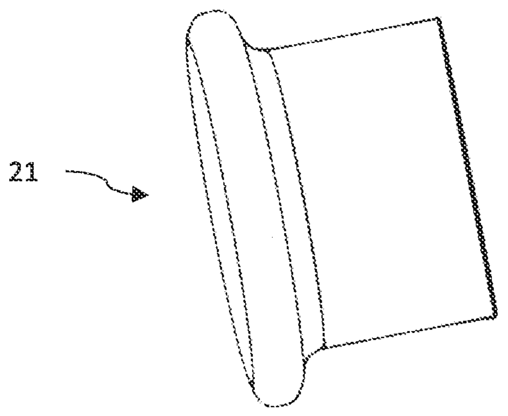

Referring now to FIGS. 8 and 9, which depict parts of a retrofitting kit 80 for a gyratory crusher according to the disclosure. Many features of the retrofitting kit 80 is the same, or similar, as corresponding features of the gyratory crusher already being described with reference to FIGS. 1 to 6. The parts of the retrofitting kit 80 being for rotating an upper crusher frame of a gyratory crusher relative to a lower crusher frame of the gyratory crusher around a vertical axis during a rotation mode of the upper crusher frame. The retrofitting kit 80 comprises a gear ring 51. The gear ring 51 is formed as a toothed ring 51. The gear ring 51 is formed to enclose the lower crusher frame of a gyratory crusher. The gear ring 51 is configured to be rotatable relative to the lower crusher frame around the vertical axis, to be in engagement with the upper crusher frame, and to rotate the upper crusher frame in the rotation mode. Furthermore, the retrofitting kit 80 comprises a drive system comprising one or more pinions 52. The one or more pinions 52 are configured to rotate the gear ring 51 relative to the lower crusher frame around the vertical axis. The pinions 52 are engaged with the toothed ring 51. The pinions 52 are supported by arms 53. The arms 53 are configured to be connected to the lower crusher frame of a gyratory crusher. The arms 53 may be connected to the lower crusher frame of a gyratory crusher by bolting or welding. Furthermore, within the arms 53 spaces are formed for accommodating drive means 55 for the pinions 52. The drive means 55 may be one or more hydraulic motors 55. The gear ring 51 is supported by one or more support structures 56. The one or more support structures 56 presents one or more support surfaces 57, shown FIG. 4, for supporting the gear ring 51. The gear ring 51 is configured to rotate on the one or more support surfaces 57. The support structures 56 comprises a low friction material 58. The low friction material 58 presents the support surface 57. The support structures 56 comprises a support arm 59. The support arm 59 is configured to be connected to the lower crusher frame. The support arm 59 may be connected to the lower crusher frame by bolting or welding. The retrofitting kit 80 further comprises one or more fastening elements 21 presenting one or more protrusions 21. The fastening elements 21 are configured to be attached to an upper crusher frame. The fastening element 21 may be attached to the upper crusher frame by bolting or welding. The retrofitting kit 80 further comprises one or more slot structures 54. The slot structures 54 are connected to the gear ring 51. The slot structures 54 may be bolted or welded onto the gear ring 51. The slot structures 54 are configured to engage the protrusions 21 when in use on the gyratory crusher. The slot structures 54 defines vertical slots 541. The protrusions 21 are configured to be received in the vertical slots 541, thus forming a keyed connection between the protrusions 21 and the slot structures 54. The retrofitting kit 80 further comprises one or more support devices 60. The support devices 60 are configured to be disposed in-between the lower crusher frame and the upper crusher frame. The support devices 60 when disposed between the lower crusher frame and the upper crusher frame are configured to support the upper crusher frame during rotation thereof and to facilitate rotation of the upper crusher frame. The support devices 60 may be formed as one or more pads presenting a low friction surface for the upper frame to rotate on, when disposed between the lower crusher frame and the upper crusher frame.

Although some embodiments have been described and shown in detail, the invention is not restricted to them, but may also be embodied in other ways within the scope of the subject matter defined in the following claims. In particular, it is to be understood that other embodiments may be utilized and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A gyratory crusher for comminution of material fed into the crusher, the gyratory crusher comprising:
- an active crushing member consisting of a main shaft, a crushing head and a mantle which mantle presents an outer surface against which material crushing is made;
- an upper crusher frame for supporting one or more wear parts, wherein the upper crusher frame defines a cone-shaped crushing chamber and is configurable between an operation mode and a rotation mode;
- a lower crusher frame;
  - wherein the upper crusher frame in the operation mode is in engagement with the lower crusher frame to prevent movement between the upper crusher frame and the lower crusher frame and wherein the engagement is released between the upper crusher frame and the lower crusher frame in the rotation mode to allow movement between the upper crusher frame and the lower crusher frame;
- a top framework which spans the crushing chamber across its top said top framework including a spider containing a machined journal which fixes the position of the upper end of the main shaft; and
- a rotation device configured to rotate the upper crusher frame in relation to the lower crusher frame in the rotation mode, and wherein the rotation device comprises a gear ring configured to be rotatable relative to the lower crusher frame around a vertical axis, and wherein the upper crusher frame is engaged with the gear ring, and configured to rotate, in the rotation mode, together with the gear ring around the vertical axis.

2. The gyratory crusher according to claim 1, wherein the rotation device further comprises a drive system comprising one or more pinions, wherein the one or more pinions are configured to rotate the gear ring relative to the lower crusher frame around the vertical axis.

3. The gyratory crusher according to claim 2, wherein the rotation device further comprises one or more arms connected to the lower crusher frame, wherein the one or more arms are configured to support the drive system.

4. The gyratory crusher according to claim 1, wherein the rotation device further comprises one or more support structures connected to the lower crusher frame, wherein the one or more support structures presents one or more support surfaces for supporting the gear ring, and wherein the gear ring is configured to rotate on the one or more support surfaces.

5. The gyratory crusher according to claim 4, wherein the one or more support surfaces comprises a low friction material for reducing friction between the gear ring and the one or more support surfaces.

6. The gyratory crusher according to claim 1, wherein the gear ring encloses the lower crusher frame.

7. The gyratory crusher according to claim 1, wherein the upper crusher frame is engaged with the gear ring such that the upper crusher frame, in the rotation mode, is allowed to move in relation to the gear ring along the vertical axis.

8. The gyratory crusher according to claim 7, wherein the upper crusher frame comprises one or more protrusions, wherein the rotation device comprises one or more slot structures connected to the gear ring, and wherein the one or more protrusions are engaged with the one or more slot structures when the upper crusher frame is in the rotation mode.

9. A kit comprising:

a gyratory crusher according to claim 1; and one or more support devices, the one or more support devices being configured to be disposed in-between the lower crusher frame and the upper crusher frame in the rotation mode to support the upper crusher frame during rotation thereof and to facilitate rotation of the upper crusher frame.

10. A method for rotating an upper crusher frame of a gyratory crusher relative to a lower crusher frame of the gyratory crusher, the method comprising the steps of:

a) providing a gyratory crusher according to claim 1;

b) releasing, if the upper crusher frame is in the operation mode, the engagement between the upper crusher frame and the lower crusher frame to bring the upper crusher frame from the operation mode into the rotation mode, and c) rotating, via the rotation device, the upper crusher frame relative to the lower crusher frame.

11. The method according to claim 10, wherein the step b) further comprises:

b.1) lifting the upper crusher frame to separate the upper crusher frame from the lower crusher frame;

b.2) disposing one or more support devices in between the lower crusher frame and the upper crusher frame to support the upper crusher frame during rotation thereof and to facilitate rotation of the upper crusher frame; and b.3) lowering the upper crusher frame down onto the one or more support devices.

* * * * *